(12) United States Patent
Pereboom

(10) Patent No.: US 6,898,789 B2
(45) Date of Patent: May 24, 2005

(54) COMMUNICATION SYSTEM FOR COMBINING MUTUALLY REALTED OBJECTS INTO A TRANSPORT ENTITY

(75) Inventor: Graham Pereboom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 446 days.

(21) Appl. No.: 09/780,732

(22) Filed: Feb. 9, 2001

(65) Prior Publication Data

US 2001/0049819 A1 Dec. 6, 2001

Related U.S. Application Data

(63) Continuation of application No. 09/090,037, filed on Jun. 10, 1998, now Pat. No. 6,727,955.

(30) Foreign Application Priority Data

Jun. 13, 1997 (EP) ............................................. 97201797

(51) Int. Cl.$^7$ .............................................. G06F 9/455
(52) U.S. Cl. ...................................................... 717/170
(58) Field of Search ............................... 707/201, 4, 2, 707/104.1; 345/716; 348/467, 468, 473, 425.1, 508, 912, 14.01, 14.12; 709/229; 725/134, 137; 370/235, 395.3, 389, 473, 474, 498

(56) References Cited

U.S. PATENT DOCUMENTS

| | | | | |
|---|---|---|---|---|
| 5,530,939 A | * | 6/1996 | Mansfield et al. | 707/201 |
| 5,594,490 A | * | 1/1997 | Dawson et al. | 725/67 |
| 5,617,145 A | * | 4/1997 | Huang et al. | 348/423.1 |
| 5,617,565 A | * | 4/1997 | Augenbraun et al. | 707/4 |
| 5,729,298 A | * | 3/1998 | Wester | 348/468 |
| 5,729,549 A | * | 3/1998 | Kostreski et al. | 370/522 |
| 5,734,589 A | * | 3/1998 | Kostreski et al. | 345/716 |
| 5,745,837 A | * | 4/1998 | Fuhrmann | 725/114 |
| 5,768,539 A | * | 6/1998 | Metz et al. | 709/249 |
| 5,797,001 A | * | 8/1998 | Augenbraun et al. | 707/9 |
| 5,822,324 A | * | 10/1998 | Kostresti et al. | 370/487 |
| 5,857,181 A | * | 1/1999 | Augenbraun et al. | 707/2 |
| 5,909,439 A | * | 6/1999 | Kuwabara et al. | 370/389 |
| 5,930,808 A | * | 7/1999 | Yamanaka et al. | 715/501.1 |
| 5,973,684 A | * | 10/1999 | Brooks et al. | 345/716 |
| 5,978,855 A | * | 11/1999 | Metz et al. | 709/249 |
| 5,983,247 A | * | 11/1999 | Yamanaka et al. | 715/526 |
| 6,085,248 A | * | 7/2000 | Sambamurthy et al. | 709/229 |
| 6,115,077 A | * | 9/2000 | Tsukagoshi | 348/607 |
| 6,130,898 A | * | 10/2000 | Kostreski et al. | 370/522 |
| 6,222,841 B1 | * | 4/2001 | Taniguchi | 370/389 |
| 6,353,930 B1 | * | 3/2002 | Shimoji et al. | 725/110 |
| 6,539,094 B1 | * | 3/2003 | Osakabe et al. | 380/283 |
| 6,674,477 B1 | * | 1/2004 | Yamaguchi et al. | 348/387.1 |

* cited by examiner

Primary Examiner—Anthony Knight
Assistant Examiner—Michael B. Holmes

(57) ABSTRACT

The present invention is related to a communication system in which a transmitter transmits cyclically a plurality of mutually related objects to a terminal. If said objects are used in the terminal there is no mechanism to establish whether said objects are consistent, e.g. that they are originated at the same time. To ensure that the objects are consistent, they are combined in a common transport entity. The receiver is arranged to extract only the complete set of mutually related objects from the common transport entity. Consequently, the consistency is always ensured.

12 Claims, 4 Drawing Sheets

Figure 1:
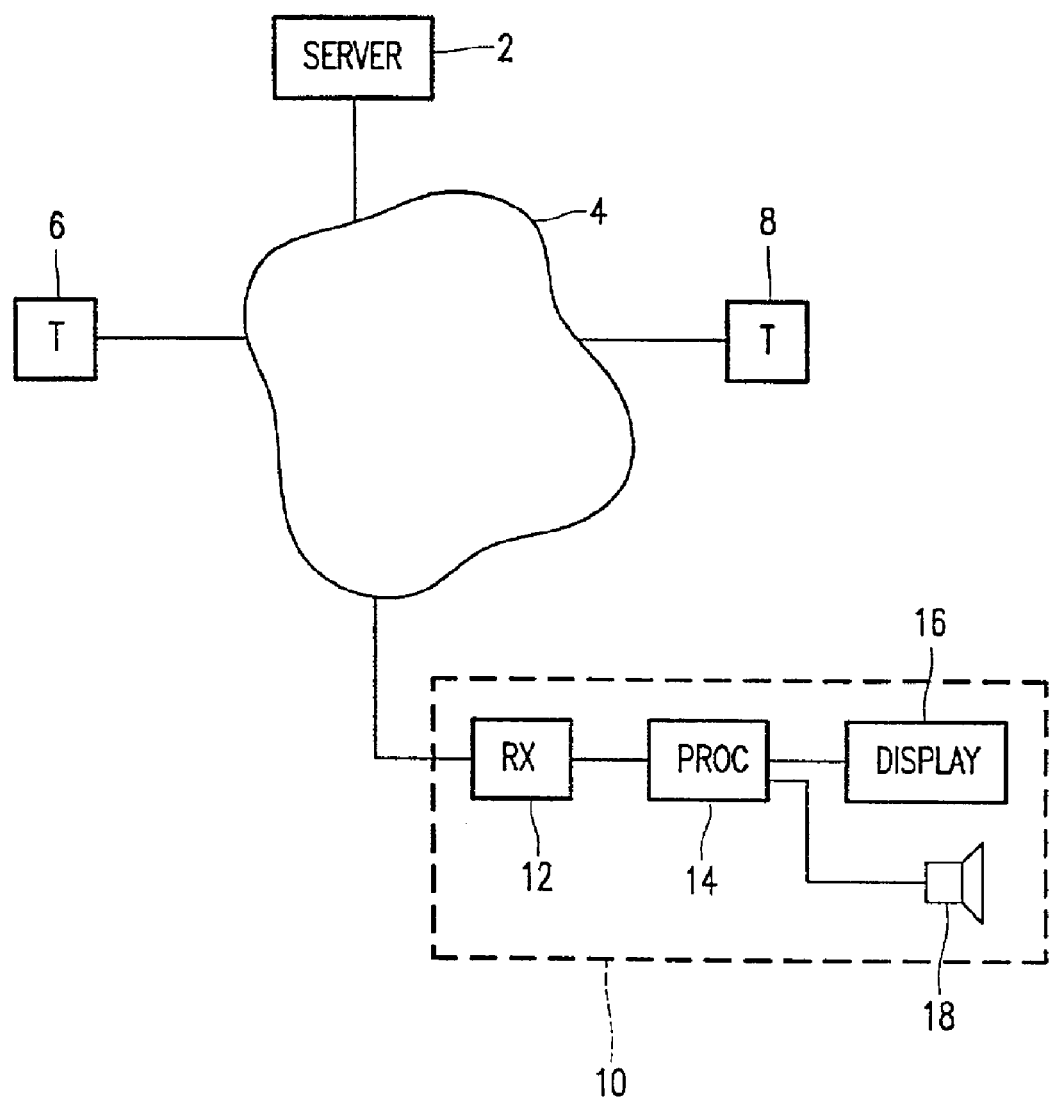

COMMUNICATION SYSTEM FOR COMBINING MUTUALLY REALTED OBJECTS INTO A TRANSPORT ENTITY

CROSS-REFERENCE TO RELATED APPLICATION

The application is a continuation of applicant's application Ser. No. 09/090,037, filed Jun. 10, 1998 now U.S. Pat. No. 6,727,955.

The present invention is related to a communication system comprising a transmitter for transmitting cyclically a plurality of mutually related objects via a communication network to a terminal, said terminal comprising processing means for processing said plurality of mutually related objects.

The present invention is also related to a transmitter, a receiver, a method, a signal and a program stored on a tangible medium which can be used in such a system.

Such a system is known from the document ISO/IEC 13522-5:1996(E) "MHEG-5 IS Document Second Draft" Chapter 5, "Overview of the MHEG-5 Classes", pp. 8–13.

The MHEG standard under development by ISO's Multimedia Hypermedia Experts Group defines a system independent encoding of the data structures used for storing, exchanging and executing multimedia presentations. The MHEG standard is very suitable for the broadcast environment. In such a broadcast environment objects are transmitted cyclically in order to enable the user to retrieve these objects, independent from the instant the terminal is switched on. A first example application is a "Stock trading" application in which regularly updated stock quotes are displayed. A second example application is a "Horse betting" application in which all horses in a selected race are shown together with information such as the winning odds per horse. In both applications the information is updated regularly. It is required that the information displayed in an application said applications is consistent, meaning that it has to be ensured that all information displayed have a common property. This property can be the time at which the information is established, as it is the case in the "Stock trading" and "Horse betting" applications.

Presently the communication system according to the above mentioned publication has no provisions to ensure the consistency of the mutually related objects. In such a system the processing means extract objects from the received signal and processes them without knowing whether these objects are still consistent with other objects already present in the running application. In the "Stock trading application" this can lead to stock prices established at different times to be displayed together as if they were established at the same time. Acting on such information could result into substantial damage for the user.

The object of the present invention is to provide a communication system in which the consistency of the mutually related objects is ensured.

To achieve said objective the communication system according to the invention is characterized in that the transmitter comprises assembling means for combining said mutually related objects into a combined transport entity, the processing means being arranged for extracting said plurality of mutually related objects from the common transport entity and for processing said plurality of said mutually related objects.

By combining the mutually related objects into a common transport entity, all mutually related objects are received simultaneously. By extracting said mutually related objects from the common transport entity and processing said mutually related objects together, consistency is ensured.

An additional advantage of using a transport entity comprising a plurality of objects is that the overhead required for transporting the objects is reduced.

An embodiment of the invention is characterized in that said transmitter is arranged for introducing into the combined transport entity an update indicator to indicate that the combined transport entity is updated, and in that the processing means being arranged for extracting said updated objects from the common transport entity if an update is indicated.

By introducing an update indicator, the processing means can easily determine whether the transport entity carries updated objects. If this is the case, the processing means extracts the updated values from the transport entity. Otherwise the processing means can ignore the objects, because they are the same as those already processed by the processing means. This leads to a considerable reduction of the required processing power.

A further embodiment of the invention is characterized in that the transport entity comprises a header indicating the size of the header and the size of the objects combined into said transport entity, and in that the update indicator comprises a version number.

By indicating the size of the different elements of the transport entity, such as header and objects, the position of each element in the transport entity can be calculated easily. An advantage of indicating the size of the different elements instead of indicating their absolute position in the transport entity is the reduced amount of data required to indicate the position of the objects in the transport entity.

Figure 2:
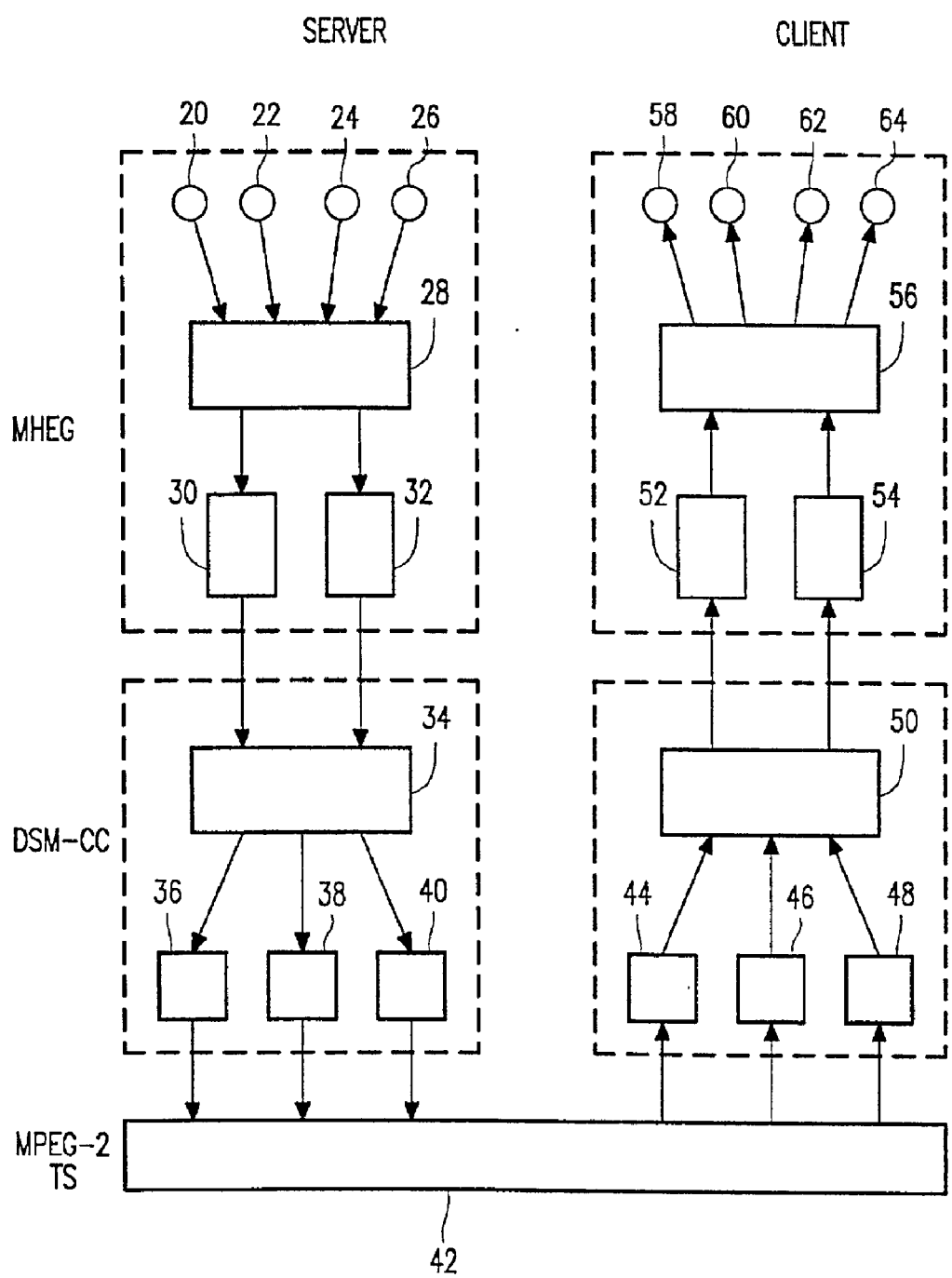
Figure 3:
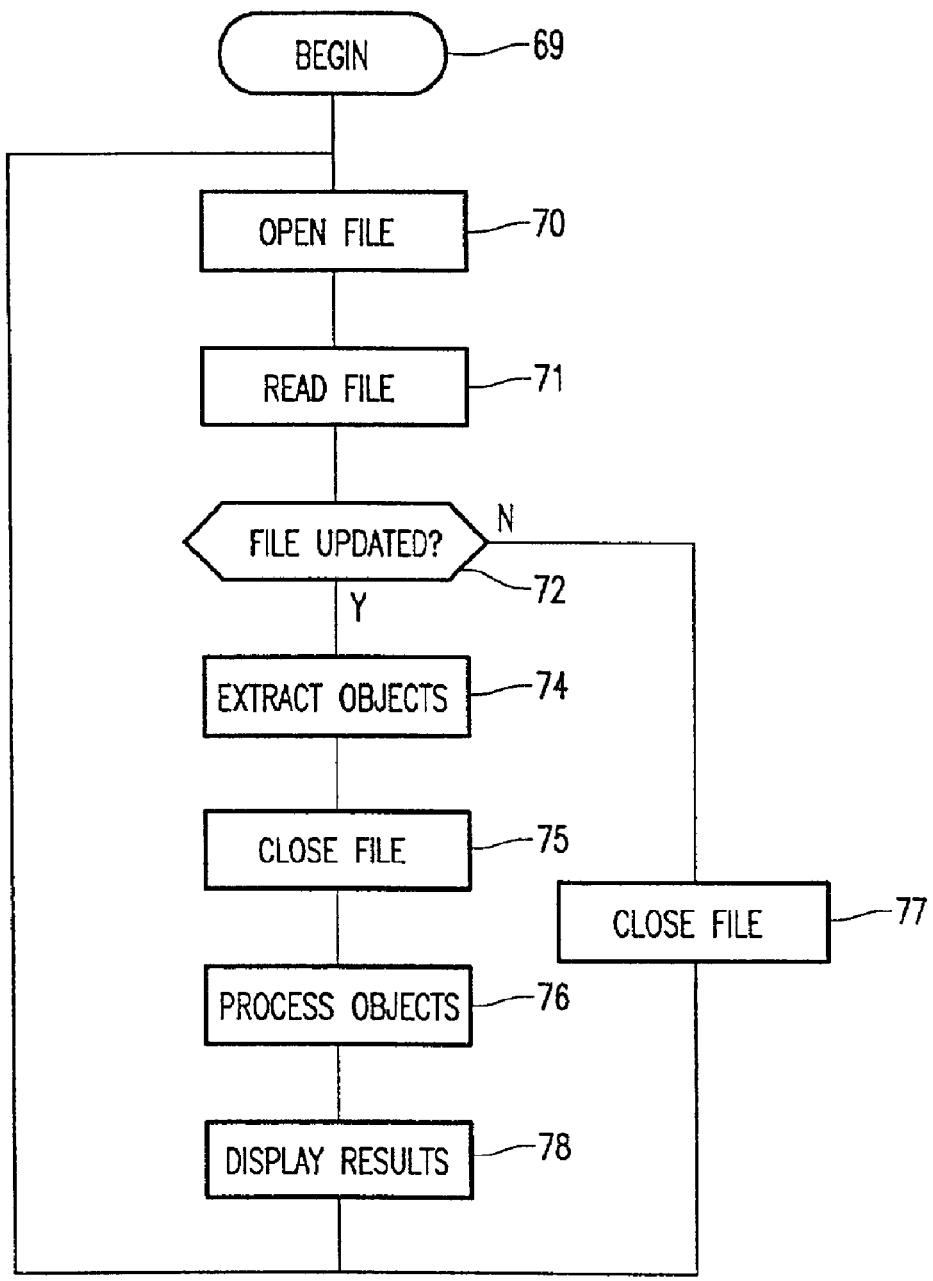
Figure 4:
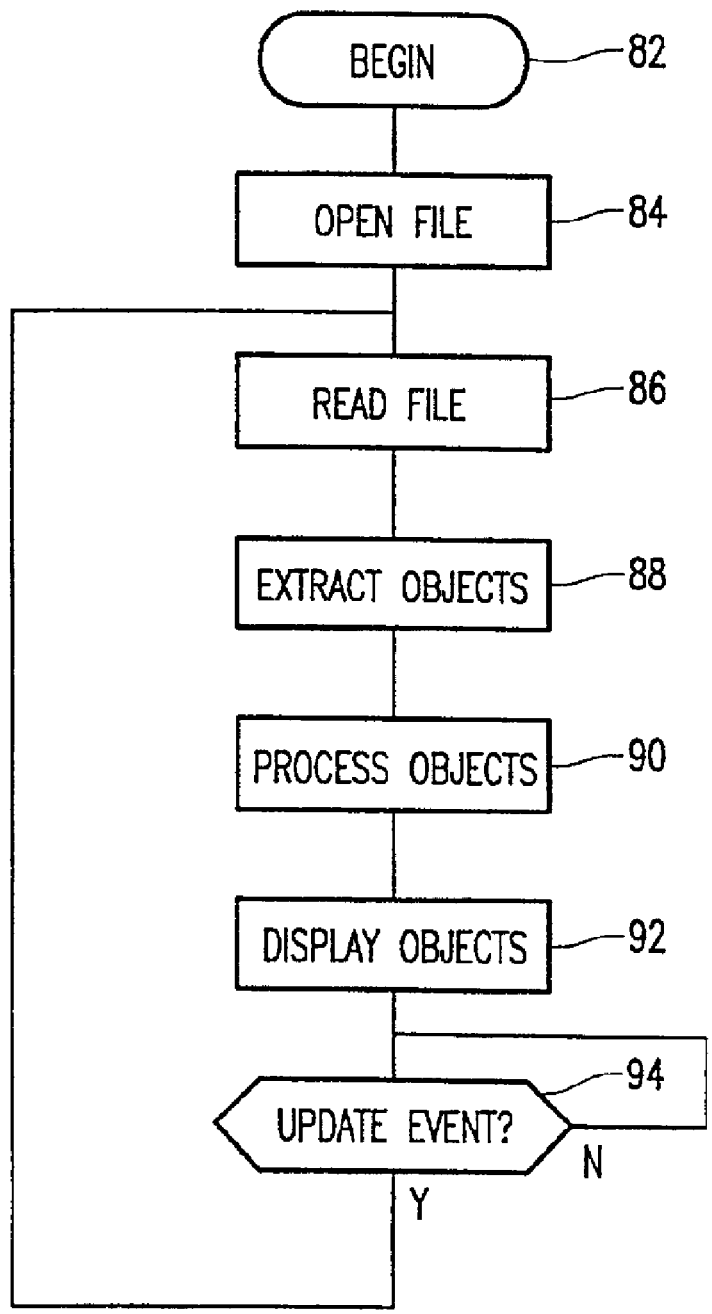

The invention will now be explained with reference to the drawing figures. Herein shows:

FIG. 1, a general block diagram of a communication network in which the present invention can be applied;

FIG. 2, a protocol stack to be used in a communication network according to the invention;

FIG. 3, a flow graph of a program running on the processor 14 in the terminal 10 of FIG. 1;

FIG. 4, a flow graph of an alternative program running on the processor 14.

In the communication system according to FIG. 1, a broadcast server 2 is coupled to a broadcast network 4. To the broadcast network 4, terminals 6, 8 and 10 are connected. The input signal of terminal 10 is applied to a receiver 12 which deals with tuning, amplification, demodulation and detection of the input signal, and presents an MPEG-2 transport stream to a processor 14. The constitution of an MPEG-2 transport stream is described in the ISO/IEC MPEG-2 standard which in incorporated by reference herein.

The processor 14 is arranged for extracting the desired information from the MPEG transport stream including the transport entities comprising the plurality of mutually related objects. Said plurality of mutually related objects is broadcasted periodically in order to enable the processor to receive said objects independent from the moment the processor is switched on. The processor is also arranged for processing the mutually related objects and presenting the result on a display 16b and playing associated audio via the audio system 18.

FIG. 2 shows the relevant protocols and part of their details involved in the transmission system according to the invention. In the server the MHEG protocol is used to define the objects to be used by the MHEG virtual machine in the client to realize the desired application. According to the inventive concept of the present invention, a plurality of related objects 20, 22, 24 and 26 is combined into a combined transport entity by an Object Combiner 28. In the present embodiment of the invention this combined transport entity is a file. The file comprises a header in which the header size, the version number and the sizes of the included objects are given. The Header size is represented by an 8 bit number. Said number indicates the size of the header in bytes. The Version number is represented by 8 bits. The Object size is represented by a 16 bit number which indicates the size of the corresponding object in bytes. Consequently up to 128 objects, each having a maximum size of 64 kbyte can be combined in such a file.

The files 30 and 32 to be transmitted are passed to the DSM-CC protocol for further transmission. The DSM-CC protocol is described in ISO/IEC International Standard 13818-6, "MPEG-2 Digital Storage Media Command and Control", 12 Jul. 1996 which is incorporated by reference herein. In the DSM-CC layer the files 30 and 32 are packed in a so-called User to User Object Carousel by a transport protocol layer 34, in order to transmit the files cyclically in a broadcast signal. The data from said User to User Object Carousel is split up in packets 36, 38 and 40. Said packets are output from the DSM-CC layer and subsequently embedded in an MPEG-2 Transport stream 42 for transmission to the client.

The client extracts packets 44, 46 and 48 from the MPEG-2 transport stream 42, and passes them to the transport protocol layer 50. The transport protocol layer extracts the files 52 and 54 from the User to User Object Carousel as is requested by the MHEG layer. Said files 52 and 54 passed to the MHEG layer where the different objects are extracted from the file and subsequently processed.

In the flowgraph according to FIG. 3, the numbered instructions have the meaning according to the table below.

| Nr. | Inscription | Meaning |
| --- | --- | --- |
| 69 | BEGIN | The program is started. |
| 70 | OPEN FILE | A request for opening a given file is passed to the DSM-CC layer. |
| 71 | READ FILE | The file as presented by DSM-CC is read. |
| 72 | FILE UPDATED? | It is checked whether the file is updated since the previous read operation. |
| 74 | EXTRACT OBJECTS | The objects are extracted from the file. |
| 75 | CLOSE FILE | The presently open file is closed. |
| 76 | PROCESS OBJECTS | The objects extracted from the file are processed. |

-continued

| Nr. | Inscription | Meaning |
| --- | --- | --- |
| 77 | CLOSE FILE | The presently open file is closed. |
| 78 | DISPLAY RESULTS | The results of the processing of the objects is displayed. |

In instruction 69 the program is started and the data structures used are initialized. In instruction 70 an "OPEN FILE" instruction is passed to the DSM-CC layer. The "OPEN FILE" instruction has to be accompanied by a file identifier in the form of an ASCII string. The file identifier can comprise a Source field (optional), a Path Origin, a Path and a File name. The source component is optional, and specifies the data source to be used to retrieve the data. Each source identification terminated with ":". The default source identification is "DSM:". DAVIC 1.2 does not specify any further data sources, but the use of further source identifications is permitted. The Path Origin can be "//" or "/". If the Path Origin is "//", then the following path and file name are to interpreted as an absolute path starting from the root of the current Service Gateway to which the runtime application is attached.

A Service Gateway is an entry point for the present active service. To find the requested file, the transport protocol layer in the client retrieves a Directory object corresponding to said Service gateway from the Transport stream. Where to find said Service Gateway in the transport stream is broadcasted on the so-called User to Network Data Carousel. The definition of said User to Network Data carousel is downloaded into the client. The Directory Object corresponding to said Service includes the names of the directories in the root of the present Service Gateway and which User to User Object Carousel carries the corresponding Directory Objects, and where it can be found in said User to User Object Carousel. In such way the directory tree is subsequently searched until the desired File Object is found. Said file object is presented by the DSM-CC layer to the MHEG layer.

If the Path Origin is "/" then the following path and file name is to be interpreted as a relative path starting from the directory that contains the current application Object. The retrieval of the file is done in the same way as explained before, but now a Directory Object or File Object, if applicable, is retrieved from the current directory.

In instruction 71 the content of the file presented by the DSM-CC layer in response to the "OPEN FILE" instruction is read.

In instruction 72 it is checked whether the content of the file is updated since the previous read operation. This check can be performed by comparing the version number of the presently read file to the version number from the previously read file.

If the version number has not changed, the content of the file is not updated, and the program continues with instruction 77 in which the presently open file is closed.

After the execution of instruction 77, the program is continued with instruction 70 to open the file again to see whether it is updated. It is of course possible that a waiting time is introduced before the "FILE OPEN" request is submitted to the DSM-CC layer in order to reduce the required processing resources.

If the version number has changed, in instruction 74 the mutually related objects are extracted from the file. These mutually related objects are processed in instruction 76. In the case of the "Stock Trading" application, said processing can e.g. comprise the composition of a Top 10 list of fastest rising stocks from a set of 50 represented by the mutually related objects. Each object comprises a stock identification and its current value. The relation between them is the time at which the values are established. In order to prevent that values determined at different times, the server combines the objects established at a given time into one file, preventing that the application can read values established at different times from the broadcast channel.

In instruction 78 the results of the processing of the objects extracted from the file is written to the display 16. It is observed that it is possible that not all objects are extracted from the file, but only a particular group of mutually related objects.

After the execution of instruction 78, the program is continued with instruction 70 to open the file again to see whether it is updated. It is of course possible that a waiting time is introduced before the "FILE OPEN" request is submitted to the DSM-CC layer in order to reduce the required processing resources.

The program according to FIG. 3 keeps running until the application which uses it is stopped.

In the present example the application knows in advance that the mutually related objects can be updated. It is however also possible that this is not known beforehand, but that it is signalled as an attribute of an object. A covenient way to do this is to set the attribute OriginalContentCachePriority to zero. This means that no caching is allowed of the object (e.g. from the class TEXT), and that it may change over time. The application has to take the appropriate measures as e.g. is explained above.

In the flowgraph according to FIG. 4, the numbered instructions have the meaning according to the table below.

| Nr. | Inscription | Meaning |
| --- | --- | --- |
| 82 | BEGIN | The program is started. |
| 84 | OPEN FILE | A request for opening a given file is passed to the DSM-CC layer. |
| 86 | READ FILE | The file as presented by DSM-CC is read. |
| 88 | EXTRACT OBJECTS | The objects are extracted from the file. |
| 90 | PROCESS OBJECTS | The objects extracted from the file are processed. |
| 92 | DISPLAY RESULTS | The results of the processing of the objects is displayed. |
| 94 | UPDATE EVENT? | It is checked whether the file is updated. |

For the embodiment of the invention according to FIG. 4, it is necessary that the DSM-CC layer is extended with a "file update event". This "file update event" is made available by the server to all clients having a file opened that is updated by the server. Using said "file update event" dispenses with the numerous "OPEN FILE" and "CLOSE FILE" operations which are required to check whether a file is updated.

In instruction 82 the program is started and the used data structures are initialized. In instruction 84 an "OPEN FILE" instruction is passed to the DSM-CC layer. The "OPEN FILE" instruction has to be accompanied by a file identifier in the form of an ASCII string as is already explained above.

In instruction 86 the content of the file presented by the DSM-CC layer in response to the "OPEN FILE" instruction is read.

In instruction 88 the mutually related objects are extracted from the file. These mutually related objects are processed in instruction 90.

In instruction 92 the results of the processing of the objects extracted from the file is written to the display 16. It is observed that it is possible that not all objects are extracted from the file, but only a particular group of mutually related objects.

After the execution of instruction 92, the program is continued with instruction 94 to check whether an update event is received from the DSM-CC layer. If an "file update event" is detected, the program is started again at instruction 86. It is observed that during the execution of the program according to FIG. 4 the file is never closed, because the file has always to be open to inform the DSM-CC layer that all "file update events" have to be passed to the MHEG layer.

It is further observed that the instruction 94 is represented as a waiting loop, but it is often advantageous to deal with the "file update event" on basis of an interrupt mechanism.

What is claimed is:

1. Communication system comprising a transmitter for transmitting cyclically a plurality of mutually related objects via a communication network including assembling means for combining the mutually related objects that relate to an application at a given time into a combined transport entity to allow transmission consistency of the objects, wherein the transport entity includes an indication of size for each of the mutually related objects; and a terminal connected to the network for receiving the objects and including processing means for processing the plurality of mutually related objects for extracting the plurality of mutually related objects from the common transport entity and the indication of size for each of the mutually related objects, using the indication of size to determine the position of each object in the transport entity.

2. The communication system according to claim 1, in which transmitter is for introducing into the combined transport entity an update indicator to indicate that the combined transport entity is updated, and the processing means is for extracting the updated objects from the common transport entity if an update is indicated.

3. The communication system according to claim 1, in which the transport entity comprises a header indicating the size of the header and the size of the objects combined into the transport entity, and the update indicator includes a version number.

4. A transmitter for transmitting cyclically a plurality of mutually related objects, comprising assembling means for combining said mutually related objects at a given time into a combined transport entity to allow transmission consistency of the objects, wherein the transport entity includes an indication of size for each of the mutually related objects.

5. A terminal comprising:

means for receiving a plurality of cyclically transmitted mutually related objects, and processing means for processing the plurality of mutually related objects that relate to an application at a given time and for combining into a combined transport entity for transmission consistency, wherein the transport entity includes an indication of size for each of the mutually related objects, and for extracting the plurality of mutually related objects from the common transport entity using the indication of size to determine the position of each object in the transport entity.

6. A communication method comprising:

transmitting cyclically a plurality of mutually related objects that relate to an application via a communication network to a destination, processing the plurality of mutually related objects at a given time that are received at the destination, combining the mutually related objects into a combined transport entity for transmission consistency, wherein the transport entity includes an indication of size for each of the mutually related objects;

extracting the plurality of mutually related objects from the common transport entity using the indication of size to determined the position of each object in the transport entity; and processing the plurality of mutually related objects.

7. A signal produced by a system, the signal comprising a cyclic sequence of a plurality of mutually related objects that relate to an application at a given time, combined into a combined transport entity for transmission consistency, wherein the transport entity includes an indication of size for each of the mutually related objects.

8. The signal according to claim 7, in which the combined transport entity comprises an update indicator.

9. The signal according to claim 8, in which the combined transport entity comprises a header indicating the size of the header and the size of the objects combined into the transport entity, and the update indicator comprises a version number.

10. A tangible for use by a transmitter, the tangible medium comprising:

code for transmitting cyclically a plurality of mutually related objects that relate to an application at a given time from a system and including code for combining the mutually related objects into a combined transport entity for transmission consistency, wherein the transport entity includes an indication of size for each of the mutually related objects.

11. A tangible medium for use by a receiver, the tangible medium comprising:

code for receiving a plurality of cyclically transmitted mutually related objects that relate to an application at a given time;

code for processing said plurality of mutually related objects combined into a combined transport entity for transmission consistency, wherein the transport entity includes an indication of size for each of the mutually related objects;

code for extracting said plurality of mutually related objects from the common transport entity using the indication of size to determine the position of each object in the transport entity.

12. The communication system according to claim 1, wherein the given time is the same time for each of the mutually related objects.

* * * * *